(12) United States Patent
Takeda

(10) Patent No.: US 6,791,769 B2
(45) Date of Patent: Sep. 14, 2004

(54) LENS SUPPORTING DEVICE

(75) Inventor: Toshiaki Takeda, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/405,705

(22) Filed: Apr. 3, 2003

(65) Prior Publication Data

US 2003/0189771 A1 Oct. 9, 2003

(30) Foreign Application Priority Data

Apr. 3, 2002 (JP) .................................. 2002-101128
Apr. 3, 2002 (JP) .................................. 2002-101129

(51) Int. Cl.[7] .............................. G02B 7/02; G03B 17/00
(52) U.S. Cl. .......................... 359/819; 359/811; 396/55
(58) Field of Search ............................... 359/819, 811, 359/694; 396/419, 544, 421, 52, 55, 422

(56) References Cited

U.S. PATENT DOCUMENTS

| 5,053,794 A | * | 10/1991 | Benz | 396/432 |
| 5,444,507 A | | 8/1995 | Palmer | 396/421 |
| 2002/0001143 A1 | * | 1/2002 | Verbiest | 359/819 |

FOREIGN PATENT DOCUMENTS

| DE | 199 14 208 A1 | 10/1999 |
| JP | 63201624 | 8/1988 |
| JP | 06189181 | 7/1994 |
| JP | 11-212155 A | 8/1999 |
| JP | 11-284900 A | 10/1999 |

* cited by examiner

*Primary Examiner*—Georgia Epps
*Assistant Examiner*—M. Hasan
(74) *Attorney, Agent, or Firm*—Birch, Stewart, Kolasch & Birch, LLP

(57) ABSTRACT

The lens supporting device has an anti-vibration adapter placed between a lens device and a camera and including a correction lens for compensating image shaking caused by vibrations applied to the camera, and a lens supporter for supporting the anti-vibration adapter and the camera on a pedestal, and is capable of supporting the lens device with stability even when used with the anti-vibration adapter being attached to the lens supporter by providing the supporting member attached to the attaching part provided at the lens device and supporting the lens device. In the case with the anti-vibration adapter being attached to the lens supporter, the camera is firstly supported at a camera supporting part formed at the lens supporter through a pedestal adapter, and a screw of the lens supporter is fastened to a nut part of the anti-vibration adapter to support the anti-vibration adapter on the lens supporter. Next, a screw of the anti-vibration adapter is fastened to a nut part of the lens device to support the lens device on the anti-vibration adapter.

5 Claims, 8 Drawing Sheets

LENS SUPPORTING DEVICE

This nonprovisional application claims priority under 35 U.S.C. § 119(a) on Patent Application No(s). 2002-101128 and 2002-101129 filed in JAPAN on Apr. 3, 2002, which is(are) herein incorporated by reference.

BACKGROUND OF THE INVENTION

1. Field of the Invention

The present invention relates to a lens supporting device and, more particularly, to a lens supporting device for supporting a camera and a lens device on a pedestal such as a tripod.

2. Description of the Related Art

Japanese Patent Application Publication No. 11-212155 discloses a lens supporter through which a camera and a lens device constructing a broadcast camera are supported on a pan head of a tripod. In this lens supporter, a camera supporting part for supporting the camera is formed, and a hook with which a hook provided at a rear end part of the lens device is engaged is provided. These hooks are engaged with each other to make the lens supporter support the lens device, thereby preventing weight of the lens device from directly exerting on a connecting part (mount part) between the lens device and the camera, and preventing the mount part from being damaged.

There has been proposed another lens supporter that supports the lens device with the aforementioned hook by previously providing a nut member at an outer circumferential part of the lens device, by previously providing a screw member at the side of the lens supporter, and fastening the screw member to the nut member.

Japanese Patent Application Publication No. 11-284900 discloses an anti-vibration adapter disposed between the camera and the lens device. The anti-vibration adapter is provided with a correction lens for compensating image shaking, a vibration sensor for detecting vibrations in the vertical and lateral directions and accordingly outputting vibration information, a correction lens driving section having a linear motor and the like, and moves the correction lens to the position in which the image shaking is compensated by the correction lens driving section according to the vibration information outputted by the vibration sensor.

In a usage pattern of the broadcast lens, there is the case in which the lens is used with the aforementioned anti-vibration adapter being attached to the lens supporter having the aforementioned screw member. In this case, it is necessary to attach the lens device by displacing it forward (toward a subject side) along the optical axis by the thickness of the anti-vibration adapter in the optical axis direction, or attaching the camera by displacing it backward along the optical axis.

Here, explaining the ordinary procedure to put the camera and the lens device on the lens supporter, the lens device is easier to handle than the camera, and therefore the camera difficult to handle is first fixed at the camera supporting section of the lens supporter with use of the fixing member such as screws. Next, with this camera as a reference, the lens device easy to handle is moved to connect to the camera.

With this being the handling situation, even when the anti-vibration adapter is attached to the lens supporter, it is desired to attach the anti-vibration adapter with the camera as a reference and attach the lens device to this anti-vibration adapter without moving the camera fixed to the lens supporter.

However, the aforementioned attaching method is a method of attaching the lens device by displacing it forward in the optical axis direction with respect to the attaching position of the lens device in the case without the anti-vibration adapter, and therefore the nut part of the lens device is displaced forward in the optical axis direction relative to the screw member of the lens supporter. Consequently, the lens device cannot be supported with the screw member, thus causing the disadvantage of being incapable of supporting the lens device with stability.

The anti-vibration adapter has a control circuit section to control motion of the aforementioned correction lens, the control circuit section includes an electronic circuit board provided with a CPU, and this electronic circuit board is arranged in the adapter main body provided with the correction lens. Hence, the conventional anti-vibration adapter has the problem that the height and the width of the adapter main body become long by the installing space of the electronic circuit board to make the adapter main body large in size, because the control circuit section for the correction lens is contained inside the adapter main body. Increase in size of the adapter main body takes much time and effort in connecting operations of the lens device and the camera to the adapter main body, and it is desired to reduce the adapter main body in size from this point of view.

SUMMARY OF THE INVENTION

The present invention is made in view of the above circumstances, and has its object to provide a lens supporting device capable of supporting a lens device with a supporting member such as a screw member even when the device is used with an anti-vibration adapter being attached to a lens supporter.

The present invention has another object to provide a lens supporting device capable of reducing the size of an adapter main body of the anti-vibration adapter in the lens supporting device for supporting a broadcast camera with use of the lens supporter and the anti-vibration adapter.

In order to attain the aforementioned object, the present invention is directed to a lens supporting device, comprising: an anti-vibration adapter which is placed between a lens device and a camera and includes a correction lens for compensating image shaking caused by vibrations applied to the camera; and a lens supporter which supports the anti-vibration adapter to support the lens device and the camera on a pedestal, wherein the anti-vibration adapter has a lens supporter attaching part to which the lens supporter is attached, and a supporting member attached to a lens attaching part provided at the lens device and supporting the lens device.

In order to attain the aforementioned object, the present invention is also directed to a lens supporting device, comprising: a lens supporter which has a camera supporting part at which a camera is supported, and a first supporting member capable of being attached to a first attaching part provided at a lens device to support the lens device; and an anti-vibration adapter which is placed between the lens device and the camera and includes a correction lens for compensating image shaking caused by vibrations applied to the camera, wherein the anti-vibration adapter comprises: an adapter main body which includes the correction lens; and an adapter supporting member which is connected to the adapter main body and has a second attaching part capable of being attached to the first supporting member of the lens supporter and a second supporting member capable of being attached to the first attaching part of the lens device to support the lens device; wherein when the camera and the lens device are supported at the lens supporter, the camera is supported at the camera supporting part of the lens supporter, and the first attaching part of the lens device is attached to the first supporting member of the lens supporter to support the lens device; and wherein when the camera and the lens device are supported at the lens supporter and the anti-vibration adapter, the camera is supported at the camera supporting part of the lens supporter, the second attaching part of the anti-vibration adapter is attached to the first supporting member of the lens supporter to support the anti-vibration adapter on the lens supporter, and the first attaching part of the lens device is attached to the second supporting member of the anti-vibration adapter to support the lens device on the anti-vibration adapter.

According to the present invention, the supporting member attached to the lens attaching part of the lens device is provided at the anti-vibration adapter attached to the lens supporter, and therefore the lens device can be supported with stability.

When the camera and the lens device are supported on the lens supporter, the camera is supported at the camera supporting part of the lens supporter, and the first attaching part of the lens device is attached to the first supporting member of the lens supporter to support the lens device. Meanwhile, when the anti-vibration adapter is attached to the lens supporter, the camera is supported on the camera supporting part formed on the lens supporter, the second attaching part of the anti-vibration adapter is attached to the first supporting member of the lens supporter to support the anti-vibration adapter on the lens supporter, and the first attaching part of the lens device is attached to the second supporting member of the anti-vibration adapter to support the lens device on the anti-vibration adapter. As a result, even when the anti-vibration adapter device is used with being attached to the lens supporter, the second supporting member of the anti-vibration adapter supports the lens device, and therefore the lens device can be supported with stability.

Preferably, the second supporting member is arranged on the adapter supporting member at a position displaced toward a subject along an optical axis of the lens device relatively to the second attaching part on the adapter supporting member by a length of a thickness of the adapter main body along the optical axis. According to the present invention, when the anti-vibration adapter is attached to the lens supporter, the lens device is moved forward along the optical axis and the first attaching part of the lens device is attached to the second supporting member to make it possible to support lens device without moving the camera supported on the lens supporter.

Preferably, in the adapter supporting member, a height of a first reference plane for receiving the first supporting member of the lens supporter, and a height of a second reference plane for receiving the first attaching part of the lens device, are equal to each other relatively to an upper face of the adapter supporting member. According to the present invention, the vertical position at the time when the lens device is supported on the lens supporter and the vertical position at the time when the lens device is supported on the anti-vibration adapter is not changed, and therefore it is not necessary to readjust the vertical position of the lens device. Consequently, positioning of the lens device is facilitated.

Further, in order to attain the aforementioned object, the present invention is directed to a lens supporting device, comprising: an anti-vibration adapter which is placed between a lens device and a camera and includes a correction lens for compensating image shaking caused by vibrations applied to the camera; and a lens supporter which supports the anti-vibration adapter to support the lens device and the camera on a pedestal, wherein a control circuit section of the anti-vibration adapter is arranged on a bottom surface of the anti-vibration adapter, and the control circuit section of the anti-vibration adapter is positioned in a space between the anti-vibration adapter and the lens supporter.

According to the present invention, the control circuit section of the anti-vibration adapter is positioned in the space formed between the anti-vibration adapter and the lens supporter, and therefore the adapter main body of the anti-vibration adapter can be reduced in size.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

A preferred embodiment of a lens supporting device according to the present invention will be explained in detail below with reference to the attached drawings.

Figure 1:
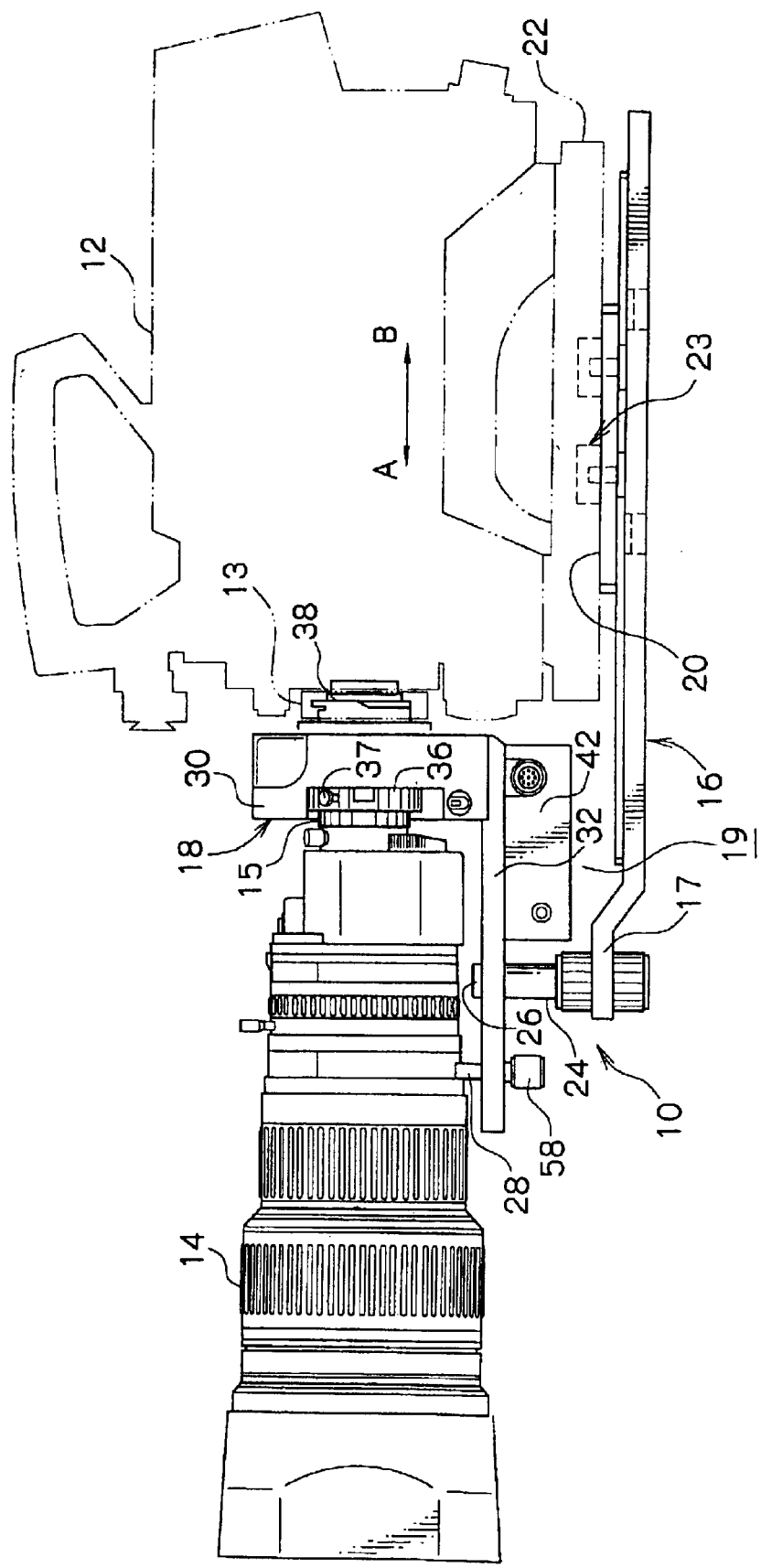
FIG. 1 is a side view showing a state in which a broadcast camera is supported by a lens supporting device of an embodiment.

FIG. 1 shows a side view of a camera 12 (illustrated with alternate long and two short dashes lines) and a lens device 14 constructing a broadcast camera supported by a lens supporting device 10 of this embodiment. The camera 12 shown in this drawing is an ENG camera, which can be carried on the shoulder of a cameraperson, and the lens device 14 is a lens device with large magnifying power and heavy weight with, for example, a zoom ratio of 36:1 and the weight of about 4.5 kg. The camera 12 and the lens 14 are moved longitudinally, laterally and vertically on the lens supporting device 10 to perform adjustment of the optical axes, and are attached to a pan head of a pedestal (not shown) through the lens supporting device 10 to be used.

The lens supporting device 10 is constructed by a lens supporter 16 and an anti-vibration adapter 18.

In the lens supporter 16, a connecting part with the pedestal is formed on the undersurface thereof and a flat camera supporting part 20 is formed on an upper surface thereof. The camera 12 is detachably fixed at the camera supporting part 20 through a pedestal adapter 22 shown with alternate long and two short dashes lines in FIG. 1. The pedestal adaptor 22 is provided with a slider 23 movable in the arrows A and B directions (forward and backward directions). A screw (a first supporting member) 24 is attached to upwardly advance at a bent part 17 at a left end of the lens supporter 16 in FIG. 1.

Figure 2:
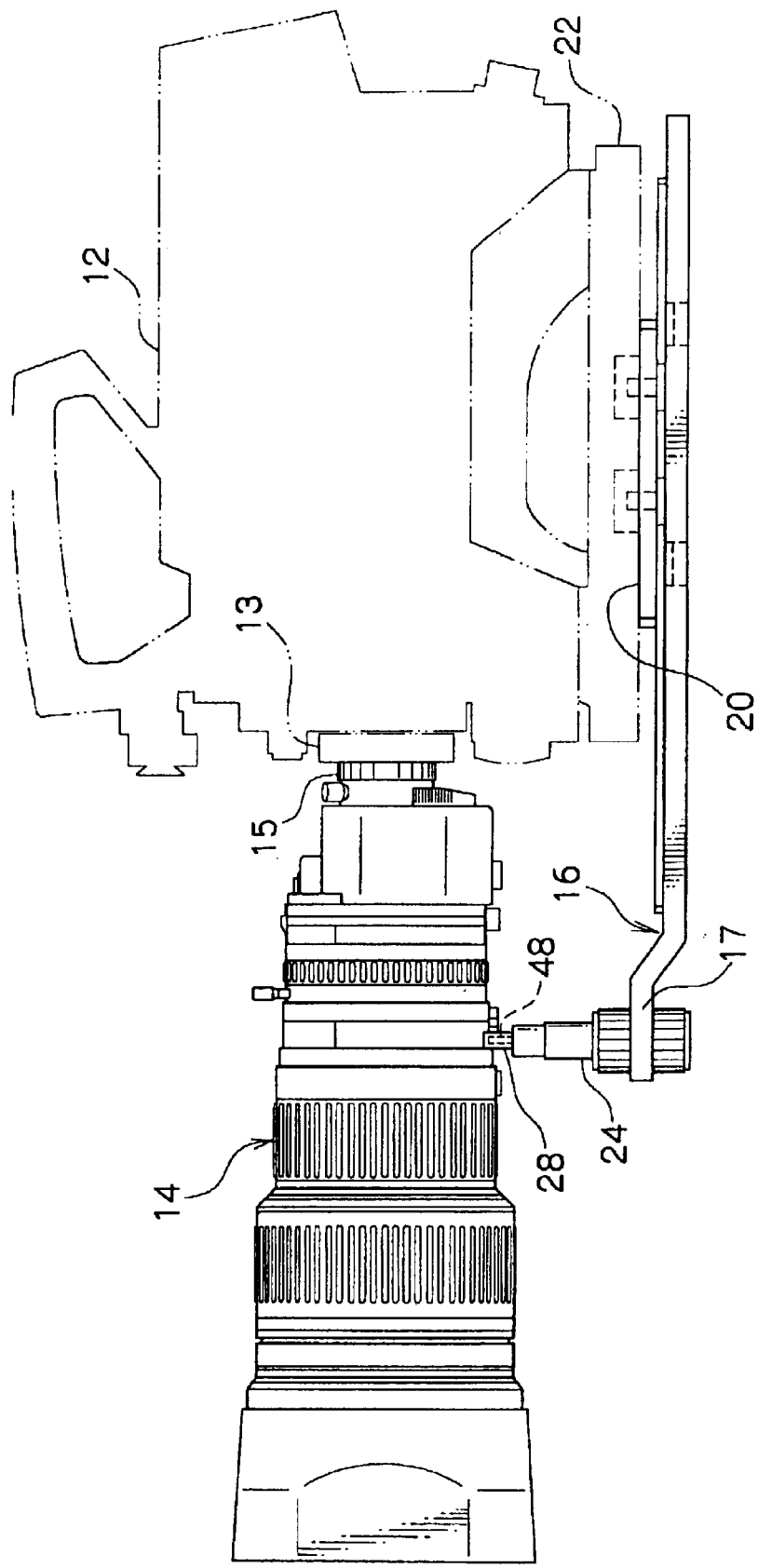
FIG. 2 is a side view showing a state in which a lens device is directly supported with a lens supporter.

When the anti-vibration adapter 18 is used as shown in FIG. 1, the screw 24 is fastened to a nut part (a lens supporter attaching part, a second attaching part) 26 formed at the anti-vibration adapter 18, and is used as a supporting member to make the anti-vibration adapter 18, to which the lens device 14 is connected, supported at the lens supporter 16. When the lens device 14 is directly supported by the lens supporter 16 without use of the anti-vibration adapter 18 as shown in FIG. 2, the screw 24 is fastened to a nut part (a lens attaching part, a first attaching part) 28 provided at an outer circumference part of the lens device 14, and is used as a supporting member to make the lens device 14 supported at the lens supporter 16.

Figure 3:
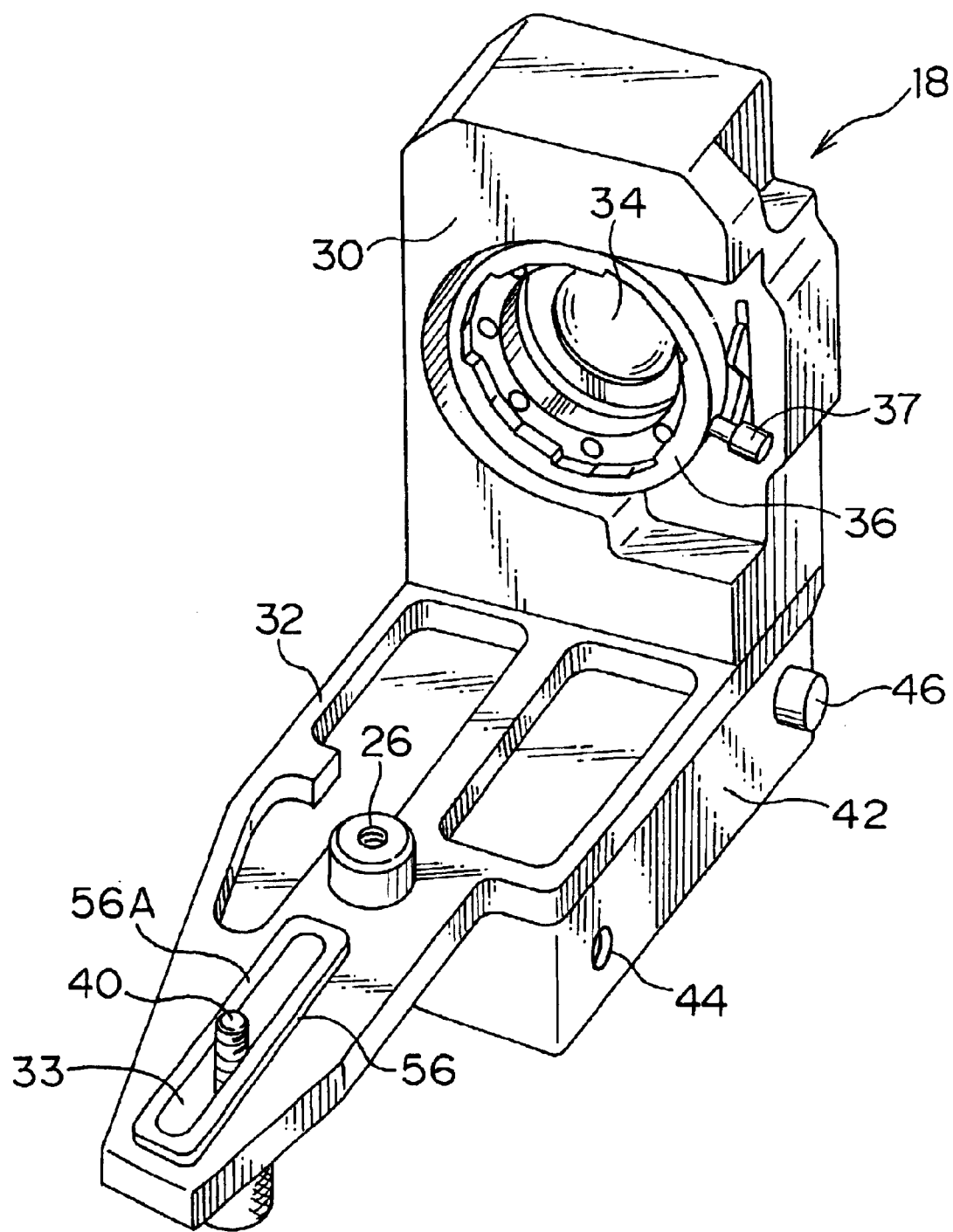
FIG. 3 is a perspective view showing an anti-vibration adapter of the embodiment.
Figure 4:
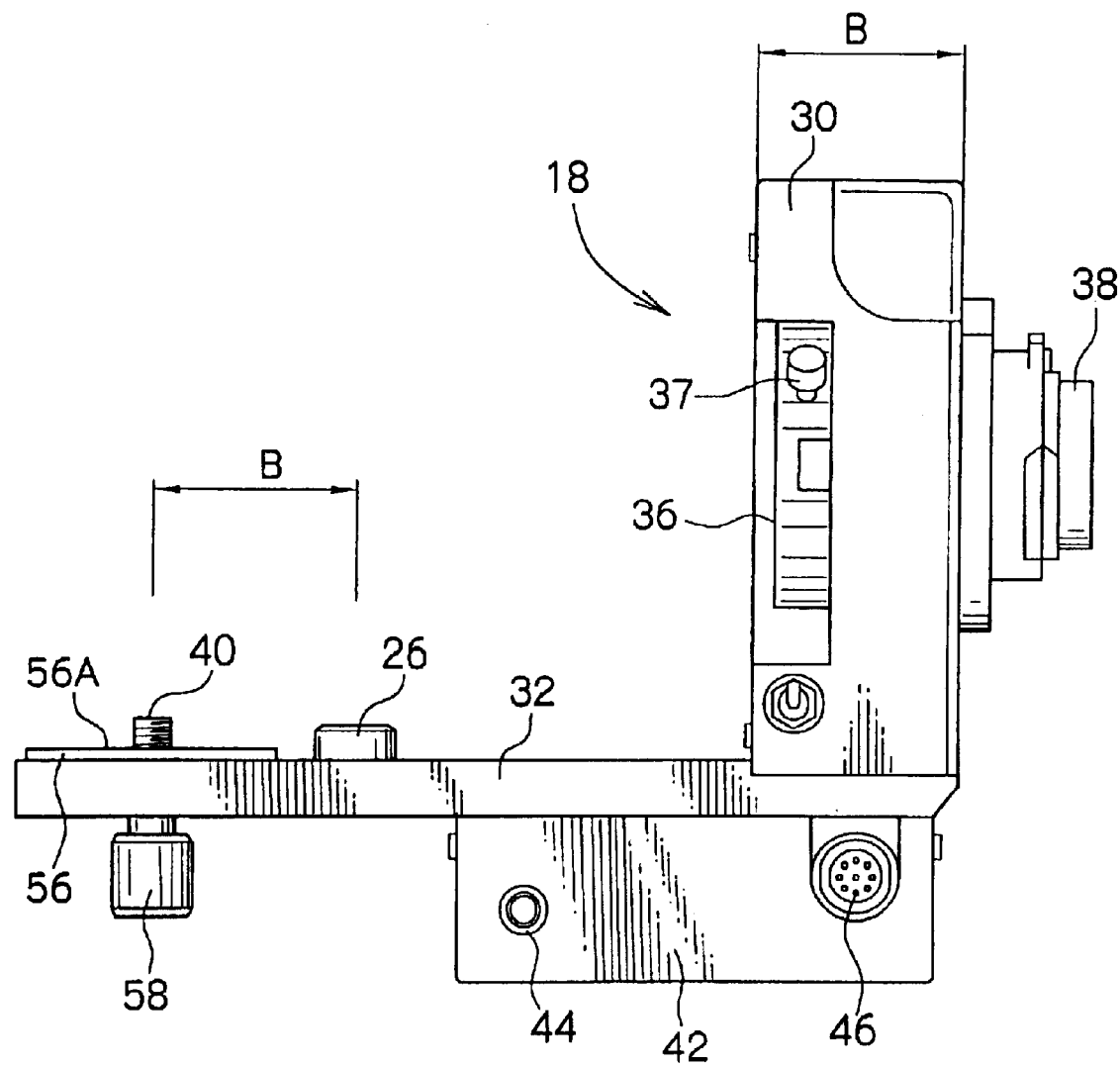
FIG. 4 is a side view of the anti-vibration adapter shown in FIG. 3.

The anti-vibration adapter 18 is constructed by an adapter main body 30 and an adapter supporting member 32 as shown in FIGS. 3 and 4. The adapter main body 30 is formed into a flat box shape, and a correction lens 34 to compensate image shaking caused by vibrations applied to the camera 12 is provided inside the adapter main body 30 as shown in FIG. 3. A mount ring 36 is rotatably provided at a side in front of the correction lens 34 of the adapter main body 30. A mount section 15 (see FIG. 1) of the lens device 14 is inserted into the mount ring 36, and the mount ring 36 is rotated by using a knob 37 to fasten the mount section 15 to the mount ring 36, whereby the lens device 14 is connected to the adapter main body 30. Further, a mount section 38 is provided at a side behind the correction lens 34 of the adapter main body 30, the mount section 38 is inserted into a mount ring 13 of the camera 12 shown with the alternate long and two short dashes lines in FIG. 1, and the mount ring 13 is to rotated to fasten the mount section 38 to the mount ring 13, whereby the camera 12 is connected to the adapter main body 30. When the lens device 14 is directly connected to the camera 12 without being connected through the anti-vibration adapter 18, the mount section 15 of the lens device 14 is inserted into the mount ring 13 of the camera 12 as shown in FIG. 2, and the mount section 15 is fastened with the mount ring 13.

As shown in FIG. 3, the adapter supporting member 32 of the anti-vibration adapter 18 is formed into a flat board form, and is provided as to connect to a lower part of the adapter main body 30 to extend forward. Thus, the anti-vibration adapter 18 is constructed in an inversed L-shape as shown in FIG. 4.

The nut part 26 to be fastened to the screw 24 (see FIG. 1) of the lens supporter 16 is formed on a top surface of the adapter supporting member 32 as shown in FIG. 3, and a screw (a supporting member, a second supporting member) 40 to be fastened to the nut part 28 of the lens device 14 is provided in front of the nut part 26.

A control box 42 is attached to an undersurface of the adapter supporting member 32 as shown in FIGS. 1 and 4. The control box 42 contains therein a control circuit and the like to control the motion of the correction lens 34 of the anti-vibration adapter 18. The control box 42 is also used as an interface for transferring information between the anti-vibration adapter 18 and the camera 12. More specifically, the control box 42 is provided with a connector 44 to be connected to a connector (not shown) of the lens device 14, as well as a connector 46 to be connected to a connector (not shown) of the camera 12. Part of pins of the connectors 44 and 46 are directly connected to each other through a cable, and information from the lens device 14 passes through the control box 42 to the camera 12. The remaining pins of the connectors 44 and 46 are connected to an electronic circuit board inside the control box 42 with cables. The electronic circuit board is a control board loaded with the control circuit of the anti-vibration adapter 18 and the like, and the control circuit takes in necessary information (for example, focal length information of the lens and the like) from the lens device 14 and the camera 12, and uses it for operation control and the like of the correction lens 34.

Conventionally, since the control circuit part was contained inside the adapter main body 30, the height and width of the adapter main body 30 became large by a placement space of the control circuit part, which increased the size as a whole. In order to eliminate this disadvantage, according to the present embodiment, the control circuit part provided with the electronic circuit board is separately housed in the control box 42, which is located in a dead space 19 in FIG. 1 formed between the lens supporter 16 and the anti-vibration adapter 18, thus making the adapter main body 30 compact, and making the entire anti-vibration adapter 18 compact.

Figure 5:
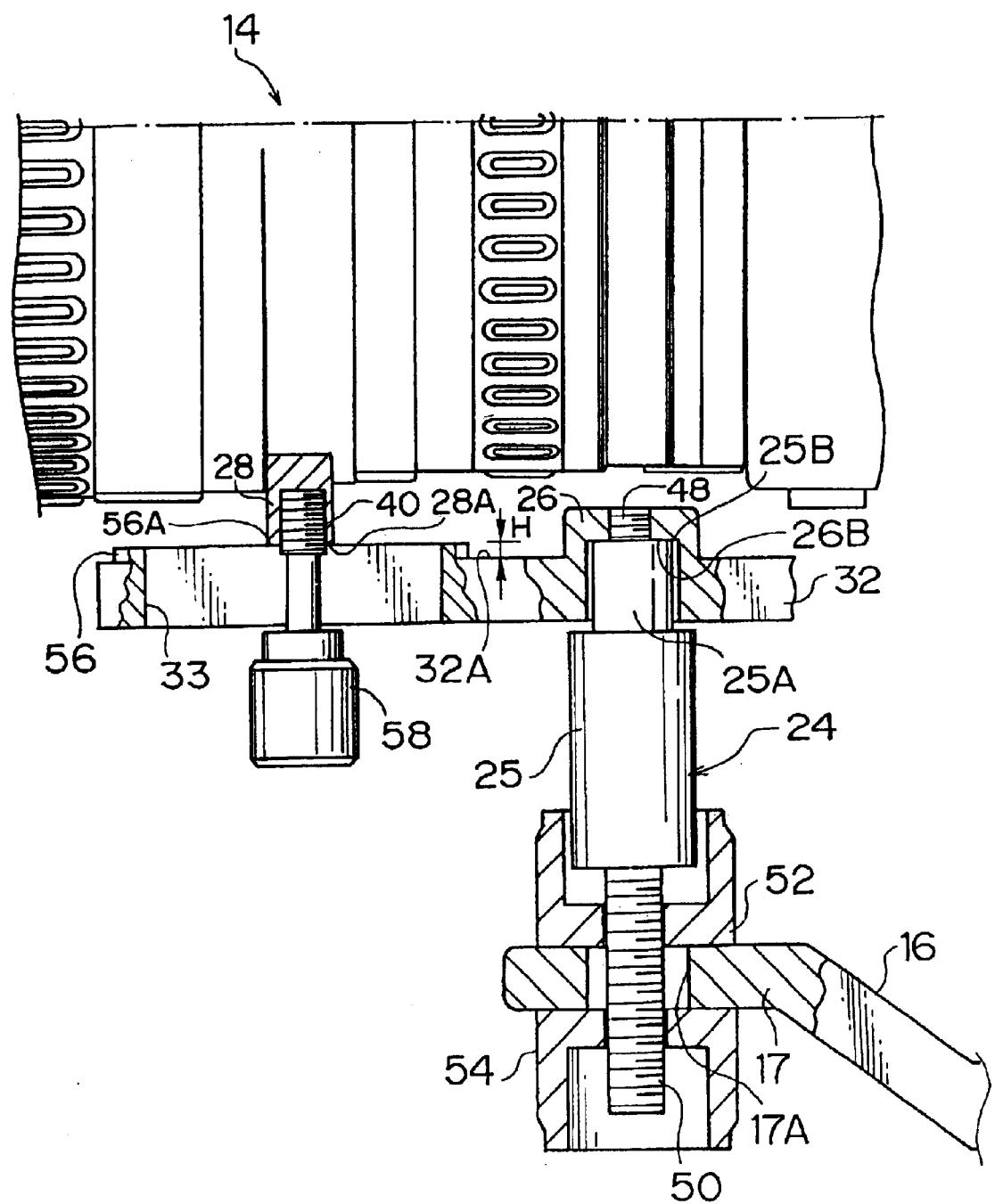
FIG. 5 is an enlarged sectional view of an essential part showing a connecting structure of the lens supporter and the anti-vibration adapter.

FIG. 5 is a detailed structural drawing of the screw 24, which connects the anti-vibration adapter 18 to the lens supporter 16. As shown in the drawing, the screw 24 is provided with external threads 48 and 50 at its both end portions (top and bottom end portions).

The external thread 48 is a screw thread fastened to the nut part 26 on the anti-vibration adapter 18, and is projectingly provided at an end portion of a small diameter portion 25A formed at a main body part 25 of the screw 24. The external thread 48 is screwed into the nut part 26 so that a top surface 25B of the small diameter portion 25A is made to abut to a lower reference plane (a first lens device mounting reference plane) 26B of the nut part 26, whereby the external thread 48 is completely fastened to the nut part 26.

The external thread 50 is penetratingly placed in a through-hole 17A formed in the bent part 17 of the lens supporter 16, and is fixed at the bent part 17 through a pair of nuts 52 and 54 which are screwed onto the external thread 50 with the bent part 17 between them. In this fixing state, by loosening the nut 52 and turning the nut 54, the screw 24 is vertically moved with respect to the lens supporter 16 by the action of the screw, so that the anti-vibration adapter 18 is vertically moved with respect to the lens supporter 16, and therefore a vertical position of the anti-vibration adapter 18 with respect to the lens supporter 16, namely, the vertical position of the adapter main body 30 with respect to the camera 12 is adjusted.

The screw 40 fastened to the nut part 28 of the lens device 14 is provided at a position shifted forward along the optical axis with respect to the nut part 26 of the adapter supporting member 32 by length B of the thickness of the adapter main body 30 along the optical axis as shown in FIG. 4. The screw 40 is penetratingly placed in a long hole 33 penetratingly formed in the adapter supporting member 32 as shown in FIG. 3, and is given a play by the length of the long hole 33 in the longitudinal direction along the optical axis. Further, a seat 56 is formed around the long hole 33. A knob 58 is attached to the screw 40 at the position in which the screw is penetrated through the long hole 33.

Figure 6:
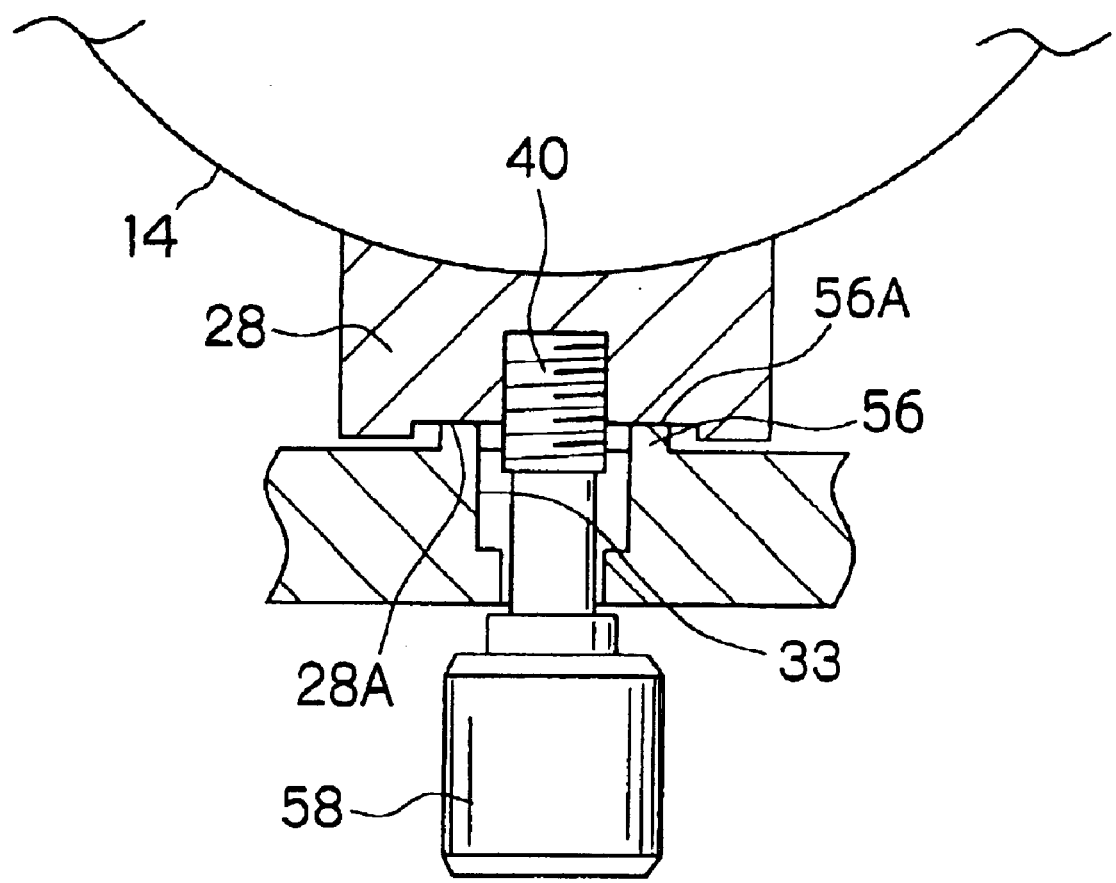
FIG. 6 is an enlarged sectional view of an essential part showing a connecting structure of the anti-vibration adapter and the lens device.

The knob 58 is turned to screw the screw 40 into the nut part 28, and the undersurface 28A of the nut part 28 is made to abut to a reference plane 56A (a second lens device mounting reference plane) of the seat 56, whereby the lens device 14 is completely supported by the adapter supporting member 32 of the anti-vibration adapter 18 as shown in FIGS. 5 and 6.

As shown in FIG. 5, the height H of the reference plane 56A of the seat 56 relative to the surface 32A of the adapter supporting member 32 is formed to be equal to the height H of the reference plane 26B of the nub part 26.

Next, an operation of the lens supporting device 10 constructed as described above will be explained.

First, as shown in FIG. 2, when the camera 12 and the lens device 14 are directly supported on the lens supporter 16, the camera 12 is supported at the camera supporting part 20 formed at the lens supporter 16 through the pedestal adapter 22, and the screw 24 of the lens supporter 16 is screwed into the nut part 28 of the lens device 14 to support the lens device 14. Thereby, the camera 12 and the lens device 14 are directly supported on the lens supporter 16.

Next, as shown in FIG. 1, when the anti-vibration adapter 18 is attached to the lens supporter 16, the camera 12 is firstly supported at the camera supporting part 20 formed at the lens supporter 16 through the pedestal adapter 22. Note that when the usage state in FIG. 1 is to be changed to the usage state in FIG. 2, it is not necessary to move the camera 12. Next, the screw 24 of the lens supporter 16 is fastened to the nut part 26 (see FIG. 5) of the anti-vibration adapter 18, whereby the anti-vibration adapter 18 is supported at the lens supporter 16. Next, the screw 40 of the anti-vibration adapter 18 is fastened to the nut part 28 of the lens device 14, whereby the lens device 14 is supported at the anti-vibration adapter 18.

As a result, the lens device 14 can be supported with the screw 40 of the anti-vibration adapter 18 when the lens supporting device 10 is used with the anti-vibration adapter 18 being attached to the lens supporter 16, and therefore the lens device 14 can be surely supported at the lens supporter 16 with stability.

As shown in FIG. 4, in the anti-vibration adapter 18 of the present embodiment, the screw 40 is provided at the position shifted forward along the optical axis relative to the nut part 26 by the length B corresponding to the thickness of the adapter main body 30 in the optical axis direction, and therefore when the anti-vibration adapter 18 is attached to the lens supporter 16, it is possible to move the lens device 14 forward along the optical axis and fasten the nut part 28 to the screw 40 without moving the camera 12 supported at the lens supporter 16.

Further, as shown in FIG. 5, in the anti-vibration adapter 18 in the present embodiment, the height H of the reference plane 56A of the seat 56 relative to the surface 32A of the adapter supporting member 32 and the height H of the reference plane 26B of the nut part 26 are formed to be equal, and therefore the vertical position at the time of the lens device 14 being supported at the lens supporter 16 (see FIG. 2) and the vertical position at the time of the lens device being supported at the lens supporter (see FIG. 1) do not change. Consequently, it is not necessary to readjust the vertical position of the lens device 14, and therefore positioning of the lens device 14 is facilitated.

Further, above all things, in the lens supporting device 10 in the present embodiment, the control circuit section for controlling the motion of the correction lens 34 of the anti-vibration adapter 16 is separately housed in the control box 42, the control box 42 is formed at substantially the right angle relative to the adapter main body 30, and this is placed in the dead space 19 formed between the lens supporter 16 and the anti-vibration adapter 18, thus reducing the size of the adapter main body 30 and making the entire anti-vibration adapter 18 compact.

Reduction of the adapter main body 30 in size facilitates the operation of connecting the camera 12 and the lens device 14 to the adapter main body 30.

In the present embodiment, the anti-vibration adapter is attached to the lens supporter and the lens device is attached to the anti-vibration adapter with use of the screws and the nuts, but these attaching devices are not limited to the screws and the nuts, but any attaching device such as a fitting structure of a receding portion and a protruding portion, which can surely position the both positions, may be used.

Figure 7:
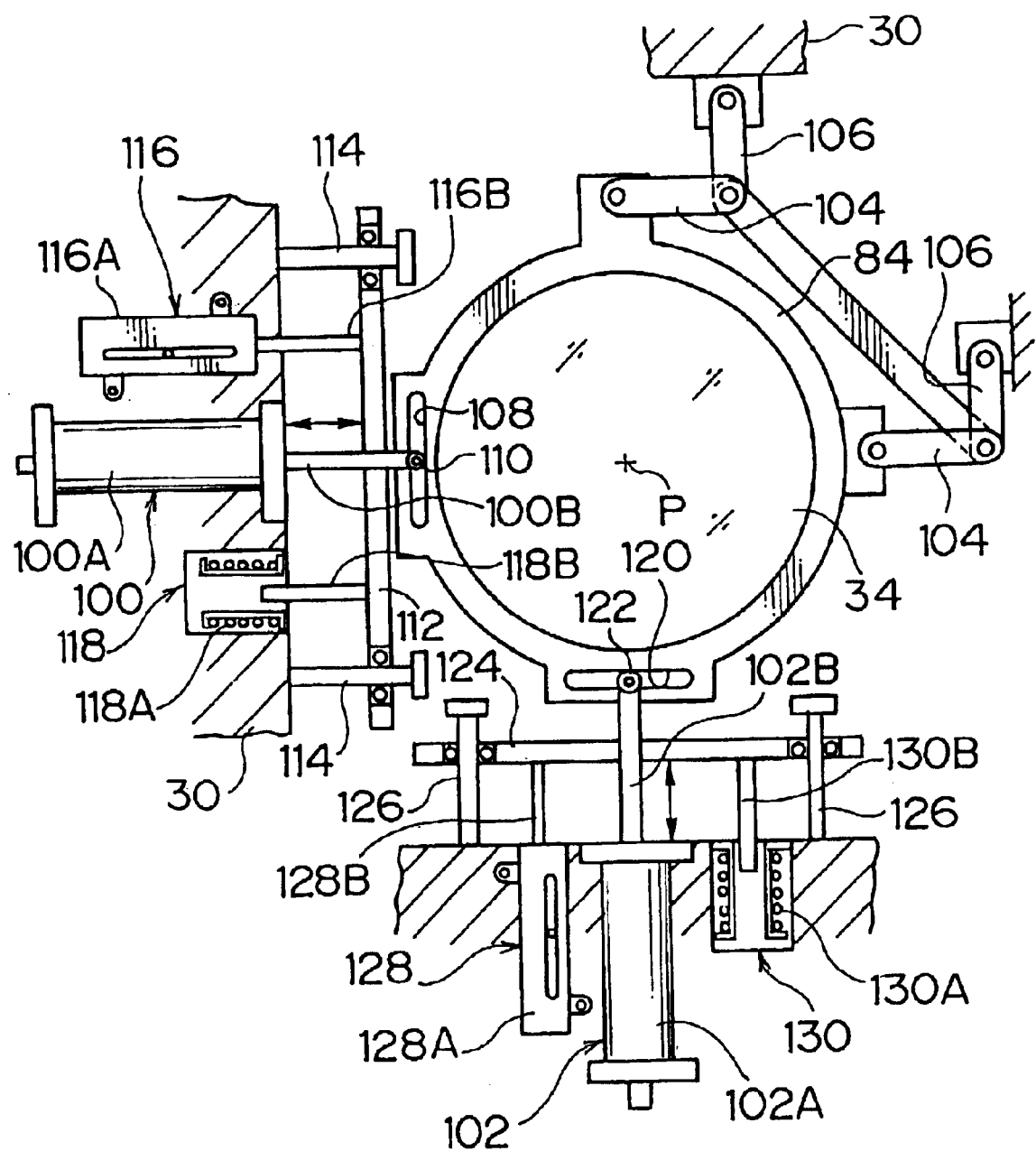
FIG. 7 is a structural diagram showing an example of an anti-vibration mechanism of a correction lens.

Next, explaining one example of an anti-vibration mechanism of the anti-vibration adapter 18, the correction lens 34 is moved in the direction to compensate image shaking within a plane perpendicular to an image taking optical axis P by linear motors 100 and 102 as shown in FIG. 7. The correction lens 34 is movably supported at the adapter main body 30 through a parallel link mechanism constituted by four arms 104, 104, 106 and 106.

The linear motor 100 moves the correction lens 34 in the lateral direction in FIG. 7, and is constructed by a motor main body 100A and a rod 100B. The motor main body 100A is fixed to the adapter main body 30, and a tip end of the rod 100B is engaged in a long hole 108 of a lens frame 84 through a roller 110. The long hole 108 is vertically formed in a left side part of the lens frame 84 in FIG. 7, and the long hole 108 and the roller 110 are engaged with each other to be relatively movable in the vertical direction in FIG. 7.

When the rod 100B is operated to extend or contract by a driving force of the motor main body 100A, the correction lens 34 is pushed or pulled by the rod 100B to move in the lateral direction in FIG. 7. When a force in the vertical direction is applied to the lens frame 84, the roller 110 is guided by the long hole 108 to move the correction lens 34 in the vertical direction in FIG. 7.

A connecting frame 112 is fixed to the rod 100B of the linear motor 100. The connecting frame 112 is placed in the vertical direction, the rod 100B is fixed to a center portion of the connecting frame 112, and an upper and a lower end portions of the connecting frame 112 are slidably supported by linear guides 114 and 114, respectively. The linear guides 114 and 114 are provided in parallel with the rod 100B, and when the rod 100B is extended and contracted, the connecting frame 112 is moved in parallel in the lateral direction while keeping its orientation.

A tip end of a measuring contact needle 116B of a position sensor 116 is pressed to abut to the connecting frame 112. In the position sensor 116, a sensor main body 116A is fixed at the adapter main body 30 at the position in which the measuring contact needle 116B is in parallel with the rod 100B, and measures a moving amount of the connecting frame 112 moved in parallel by extending and contracting movement of the rod 100B.

A speed generator 118 is constructed by a bobbin 118A and a core 118B, which is fixed to the connecting frame 112.

The linear motor 102 moves the correction lens 34 in the vertical direction in FIG. 7, and is constructed by a motor main body 102A and a rod 102B. The motor main body 102A is fixed to the adapter main body 30, and a tip end of the rod 102B is engaged in a long hole 120 of a lens frame 84 through a roller 122. The long hole 120 is laterally formed in a lower part of the lens frame 84 in FIG. 7, and the long hole 120 and the roller 122 are engaged with each other to be relatively movable in the lateral direction in FIG. 7.

When the rod 102B is operated to extend and contract by a driving force of the motor main body 102A, the correction lens 34 is pushed or pulled by the rod 102B to move in the vertical direction in FIG. 7. When a force in the lateral direction is applied to the lens frame 84, the roller 122 is guided by the long hole 120 to move the correction lens 34 in the lateral direction in FIG. 7.

A connecting frame 124 is fixed to the rod 102B of the linear motor 102. The connecting frame 124 is placed in the lateral direction, the rod 102B is fixed to a center portion of the connecting frame 124, and a left and a right end portions of the connecting frame 124 are slidably supported by linear guides 126 and 126, respectively. The linear guides 126 and 126 are provided in parallel with the rod 102B, and when the rod 102B is extended and contracted, the connecting frame 124 is moved in parallel in the vertical direction while keeping its orientation.

A tip end of a measuring contact needle 128B of a position sensor 128 is pressed to abut to the connecting frame 124. In the position sensor 128, a sensor main body 128A is fixed at the adapter main body 30 at the position in which the measuring contact needle 128B is in parallel with the rod 102B, and measures a moving amount of the connecting frame 124 moved in parallel by extending and contracting movement of the rod 102B.

In this position sensor 128 as in the position sensor 116, the measuring contact needle 128B is not made to abut directly to a circumferential surface of the lens frame 84, but it is made to abut to the connecting frame 124 by which the moving amount of the correction lens 34 can be indirectly measured.

A speed generator 130 is constructed by a bobbin 130A and a core 130B, which is fixed to the connecting frame 124.

The internal structure of the anti-vibration adapter 18 is not limited to the embodiment shown in FIG. 7, but various structures can be used to move the correction lens 34 properly by the driving device such as an actuator.

Figure 8:
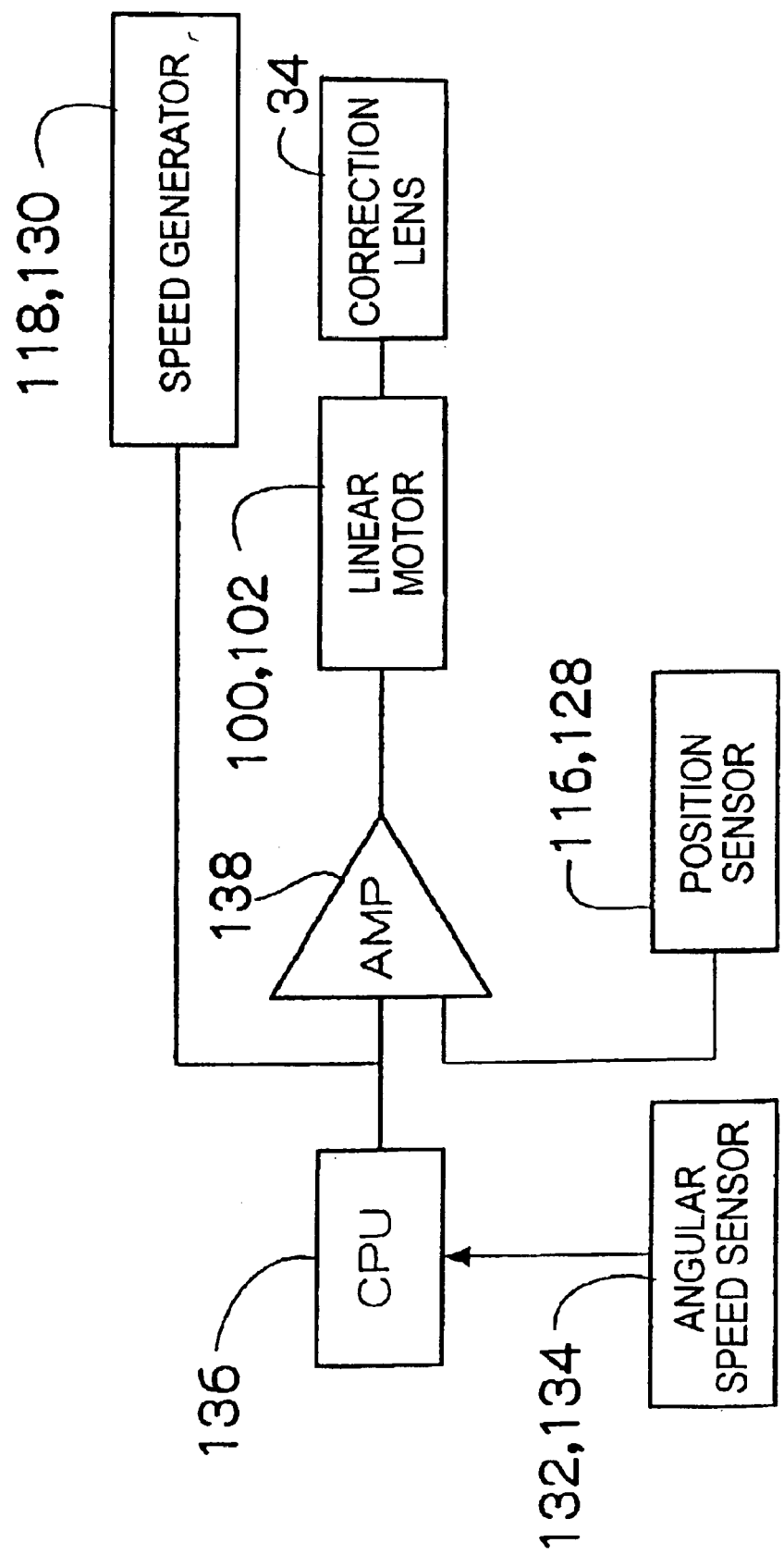
FIG. 8 is a block diagram showing a control circuit of the anti-vibration mechanism of the correction lens.

FIG. 8 is a block diagram showing a drive control system of the correction lens 34. Angular speed sensors 132 and 134 shown in FIG. 8 are placed inside the adapter main body 30. The one angular sensor 132 detects the vibrations with lateral components out of the vibrations transmitted to the camera 12, and outputs lateral vibration information according to the detected lateral vibrations to a CPU 136 constructing the control circuit section contained inside the control box 42 in FIG. 1.

The CPU 136 arithmetically operates a correction moving amount in the lateral direction which should be given to the correction lens 34 according to the lateral vibration information received from the angular speed sensor 132. A signal indicating the correction moving amount in the lateral direction is outputted to the linear motor 100 (see FIG. 7) after being amplified in an amplifier 138. The linear motor 100 is operated to extend or contract the rod 100B by the amount corresponding to the command signal from the CPU 136 to move the correction lens 34 to the image shaking correction position. As a result, the lateral vibration components ate cancelled off by the movement of the correction lens 34, whereby the image shaking in the lateral direction is controlled.

When the correction lens 34 moves in the lateral direction, the position sensor 116 measures the moving position of the connecting frame 112, and outputs the position signal according to the measured moving position. The position signal outputted by the position sensor 116 and the signal indicating the correction moving amount outputted from the CPU 136 are compared, and a feedback control is performed for the linear motor 100 so as to position the correction lens 34 at the position corresponding to the correction moving amount.

Similarly, the other angular sensor 134 detects the vibrations with vertical components out of the vibrations transmitted to the camera 12, and outputs vertical vibration information according to the detected vertical vibrations to the CPU 136. The CPU 136 arithmetically operates a correction moving amount in the vertical direction which should be given to the correction lens 34 according to the vertical vibration information received from the angular speed sensor 134, and a signal indicating the correction moving amount in the vertical direction is outputted to the linear motor 102 (see FIG. 7) through the amplifier 138. The linear motor 102 is operated to extend or contract the rod 102B by the amount corresponding to the command signal from the CPU 136 to move the correction lens 34 to the image shaking correction position. As a result, the vertical vibration components are cancelled off by the movement of the correction lens 34, whereby the image shaking in the vertical direction is controlled.

When the correction lens 34 moves in the vertical direction, the position sensor 128 measures the moving position of the connecting frame 124, and outputs the position signal according to the measured moving position. The position signal outputted by the position sensor 128 and the signal indicating the correction moving amount outputted from the CPU 136 are compared, and a feedback control is performed for the linear motor 102 so as to position the correction lens 34 at the position corresponding to the correction moving amount.

As explained thus far, according to the lens supporting device of the present invention, when the lens supporting device is used with the anti-vibration adapter being attached to the lens supporter, the lens device is supported by the supporting member of the anti-vibration adapter, and therefore the lens device can be supported with stability. Moreover, the control circuit section of the anti-vibration adapter is positioned in the space formed between the anti-vibration adapter and the lens supporter, and therefore the adapter main body of the anti-Vibration adapter can be made compact.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lens supporting device, comprising:
an anti-vibration adapter which is placed between a lens device and a camera and includes a correction lens for compensating image shaking caused by vibrations applied to the camera; and
a lens supporter which supports the anti-vibration adapter to support the lens device and the camera on a pedestal,
wherein the anti-vibration adapter has a lens supporter attaching part to which the lens supporter is attached, and a supporting member attached to a lens attaching part provided at the lens device and supporting the lens device.

2. A lens supporting device, comprising:

a lens supporter which has a camera supporting part at which a camera is supported, and a first supporting member capable of being attached to a first attaching part provided at a lens device to support the lens device; and an anti-vibration adapter which is placed between the lens device and the camera and includes a correction lens for compensating image shaking caused by vibrations applied to the camera, wherein the anti-vibration adapter comprises:

an adapter main body which includes the correction lens; and an adapter supporting member which is connected to the adapter main body and has a second attaching part capable of being attached to the first supporting member of the lens supporter and a second supporting member capable of being attached to the first attaching part of the lens device to support the lens device;

wherein when the camera and the lens device are supported at the lens supporter, the camera is supported at the camera supporting part of the lens supporter, and the first attaching part of the lens device is attached to the first supporting member of the lens supporter to support the lens device; and wherein when the camera and the lens device are supported at the lens supporter and the anti-vibration adapter, the camera is supported at the camera supporting part of the lens supporter, the second attaching part of the anti-vibration adapter is attached to the first supporting member of the lens supporter to support the anti-vibration adapter on the lens supporter, and the first attaching part of the lens device is attached to the second supporting member of the anti-vibration adapter to support the lens device on the anti-vibration adapter.

3. The lens supporting device as defined in claim 2, wherein the second supporting member is arranged on the adapter supporting member at a position displaced toward a subject along an optical axis of the lens device relatively to the second attaching part on the adapter supporting member by a length of a thickness of the adapter main body along the optical axis.

4. The lens supporting device as defined in claim 2, wherein in the adapter supporting member, a height of a first reference plane for receiving the first supporting member of the lens supporter, and a height of a second reference plane for receiving the first attaching part of the lens device, are equal to each other relatively to an upper face of the adapter supporting member.

5. A lens supporting device, comprising:

an anti-vibration adapter which is placed between a lens device and a camera and includes a correction lens for compensating image shaking caused by vibrations applied to the camera; and a lens supporter which supports the anti-vibration adapter to support the lens device and the camera on a pedestal, wherein a control circuit section of the anti-vibration adapter is arranged on a bottom surface of the anti-vibration adapter, and the control circuit section of the anti-vibration adapter is positioned in a space between the anti-vibration adapter and the lens supporter.

\* \* \* \* \*